(12) United States Patent
Miyake (10) Patent No.: US 8,751,717 B2
(45) Date of Patent: Jun. 10, 2014

(54) INTERRUPT CONTROL APPARATUS AND INTERRUPT CONTROL METHOD

(75) Inventor: Takashi Miyake, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 82 days.

(21) Appl. No.: 13/474,246

(22) Filed: May 17, 2012

(65) Prior Publication Data

US 2013/0031287 A1 Jan. 31, 2013

(30) Foreign Application Priority Data

Jul. 28, 2011 (JP) .................................. 2011-165397

(51) Int. Cl.
*G06F 13/26* (2006.01)

(52) U.S. Cl.
USPC ............... 710/264; 710/260; 340/500; 701/1; 701/36

(58) Field of Classification Search
USPC .................. 701/1, 36; 340/500; 710/260, 264
See application file for complete search history.

(56) References Cited

U.S. PATENT DOCUMENTS

| | | | | |
|---|---|---|---|---|
| 6,389,332 | B1 * | 5/2002 | Hess et al. ......................... | 701/1 |
| 6,708,078 | B1 * | 3/2004 | Skinger et al. ................. | 700/222 |
| 6,957,128 | B1 * | 10/2005 | Ito et al. .......................... | 701/1 |
| 8,089,348 | B2 * | 1/2012 | Kameyama ................... | 340/438 |
| 8,188,846 | B2 * | 5/2012 | Cooper et al. ............. | 340/425.5 |
| 8,301,317 | B2 * | 10/2012 | Placke et al. ....................... | 701/1 |
| 2006/0287787 | A1 * | 12/2006 | Engstrom et al. ............... | 701/36 |
| 2009/0292458 | A1 * | 11/2009 | Nakamura et al. ............ | 701/200 |
| 2012/0150853 | A1 * | 6/2012 | Tang .............................. | 707/728 |
| 2013/0116919 | A1 * | 5/2013 | Furuhata et al. .............. | 701/408 |

FOREIGN PATENT DOCUMENTS

| | | |
|---|---|---|
| JP | 10-104009 | 4/1998 |
| JP | 2000-065585 | 3/2000 |
| JP | 2010-079487 | 4/2010 |

* cited by examiner

*Primary Examiner* — Matthew D Spittle
(74) *Attorney, Agent, or Firm* — Brinks Gilson & Lione

(57) ABSTRACT

An interrupt control apparatus and interrupt control method reduce situations in which the output of interrupt information is suspended and thus reduce stress caused in a user, without missing the appropriate output timing for interrupt information having a high priority level. A priority level setting unit raises the value of a priority level for an interrupt voice message during a period in which the interrupt voice message is being outputted, and a voice output control unit, when interrupts from two or more overlapping interrupt voice messages occurs, carries out control in accordance with priority levels set for each of the two or more interrupt voice messages so that the interrupt voice message having the higher priority level value is preferentially outputted.

18 Claims, 5 Drawing Sheets

EXAMPLES OF PRIORITY LEVEL SET BY PRIORITY LEVEL SETTING UNIT
FOR INTERRUPT VOICE ACCORDING TO EMBODIMENT

FIG.1

ON-VEHICLE SYSTEM PROVIDED WITH INTERRUPT CONTROL APPARATUS ACCORDING TO EMBODIMENT

FIG.2

EXAMPLE OF FUNCTIONAL CONFIGURATION OF INTERRUPT CONTROL APPARATUS ACCORDING TO EMBODIMENT

EXAMPLES OF PRIORITY LEVEL SET BY PRIORITY LEVEL SETTING UNIT
FOR INTERRUPT VOICE ACCORDING TO EMBODIMENT

FIG.3(a)
REMAINING GASOLINE WARNING

FIG.3(b)
ROUTE GUIDANCE

FIG.3(c)
OBSTRUCTION WARNING

FIG.4

EXAMPLE OF OPERATIONS PERFORMED BY INTERRUPT CONTROL APPARATUS ACCORDING TO EMBODIMENT

FIG.5

EXAMPLE OF OPERATIONS PERFORMED
BY INTERRUPT CONTROL APPARATUS ACCORDING TO EMBODIMENT

REMAINING GASOLINE WARNING    ROUTE GUIDANCE (50 M)
"YOU ARE LOW ON GAS"          "IN 50 METERS, TURN RIGHT"

FIG.6

ANOTHER EXAMPLE OF SETTING PRIORITY LEVEL

OTHER EXAMPLES OF SETTING PRIORITY LEVEL

FIG.7(a)

"YOU ARE LOW ON GAS"

FIG.7(b)

"IN 50 METERS, TURN RIGHT"

INTERRUPT CONTROL APPARATUS AND INTERRUPT CONTROL METHOD

RELATED APPLICATION

The present application claims priority to Japanese Patent Application Number 2011-165397, filed Jul. 28, 2011, the entirety of which is hereby incorporated by reference.

BACKGROUND OF THE INVENTION

1. Field of the Invention

The present invention relates to interrupt control apparatuses and interrupt control methods, and is particularly suitable for use in an interrupt control apparatus that controls the output of multiple pieces of interrupt information (interrupt voice or interrupt images) in accordance with priority levels set for each of the pieces of interrupt information.

2. Related Art

The use of electronics in vehicles is increasing as of late, and on-vehicle information systems that use information technology (IT) to enhance vehicle safety, ensure more comfortable travel, and so on are increasingly being introduced. This type of on-vehicle information system often includes an on-vehicle device that provides voice information. A navigation device that uses voice information to provide route guidance to a destination, traffic information, or the like is an example of such an on-vehicle device. Meanwhile, there are also obstruction warning generation devices that use an on-vehicle camera or the like to detect obstructions in the vicinity of the vehicle and then use voice information to provide warning messages. Furthermore, it is likely that sensor warning sounds used for speed warnings, remaining gasoline warnings, or the like, which are at present outputted only as simple alarm sounds, will instead be provided as voice information such as warning messages through on-vehicle devices in the future.

Unlike radio, music, or the like, such voice information is not continuously outputted from the on-vehicle device; the voice information is instead an interrupt voice message outputted as necessary at a required timing. For example, when the vehicle approaches a point within a predetermined distance from an intersection that is part of a guidance route while music such as a CD (compact disk) is being played back, a voice message for guiding the direction of travel of the vehicle along the guidance route is provided as an interrupt voice message. In other words, the output of the music that is being played back is suspended, and the voice message for the route guidance is outputted as an interrupt.

If multiple interrupt voice messages for route guidance, an obstruction warning, a sensor warning, or the like are available, there are cases where different interrupt voice messages will occur as interrupts at the same time. In such a case, it is necessary to resolve these interrupt voice messages, and several techniques for such resolution have been proposed (for example, see JP2000-65585A, JP1998(H10)-104009A, and JP2010-79487A).

For example, with the technique disclosed in JP2000-65585A, priority levels are set for each of multiple interrupt voice messages. In the case where an interrupt voice message having a higher priority level occurs while another interrupt voice message is being outputted, the output of the current interrupt voice message is suspended, and the interrupt voice message with a higher priority level is preferentially outputted. The suspended interrupt voice message, which has a lower priority level, is then once again outputted from the beginning after the output of the high-priority level interrupt voice message ends.

Meanwhile, according to the technique disclosed in JP1998(H10)-104009A, the priority order of interrupt voice messages is made variable depending on circumstances. For example, JP1998(H10)-104009A discloses lowering the priority of information for which a long amount of time has passed since the information was included (paragraph 0113). JP1998(H10)-104009A also discloses raising the priority of navigation information and lowering the priority of other information (such as news information) when the vehicle has approached a point in a guidance route (paragraph 0115).

Furthermore, according to the technique disclosed in JP2010-79487A, in the case where new information has been received from a roadside device during the output of a voice message encouraging caution based on information previously received from a roadside device, the voice message encouraging caution based on the new information is outputted after the output of the current voice message has ended.

However, with the technique disclosed in JP2000-65585A, if an interrupt voice message having a higher priority level occurs as an interrupt during the output of another interrupt voice message, the output of that other interrupt voice message will be suspended. Suspending the output of the interrupt voice message is problematic in that it causes stress in a user who is listening to the interrupt voice messages.

Furthermore, with the technique disclosed in JP2000-65585A, the suspended interrupt voice message is once again outputted from the beginning, after the output of the higher-priority level interrupt voice message ends. There is thus a problem in that the user is forced to listen to a voice message he or she has already listened to all over again from the beginning, which causes stress in the user. In particular, in the case where the output of a voice message is suspended near the end of that voice message, the user is forced to listen to almost the entire voice message again, which causes a large amount of stress in the user.

As opposed to this, according to the technique disclosed in JP1998(H10)-104009A, the priority of navigation information is raised and the priority of news information is lowered when the vehicle is approaching a point in a guidance route. Therefore, the navigation information is given priority over the news information, and the navigation information is outputted. However, even if the vehicle is at a point in the guidance route, the output of the navigation information also will be suspended if an interrupt voice message that has a higher priority than the navigation information occurs as an interrupt. The aforementioned problem can therefore also occur in the technique according to JP1998(H10)-104009A.

According to the technique disclosed in JP2010-79487A, the output of a voice message currently being carried out is given the highest priority. Accordingly, a voice message that is currently being outputted will not be suspended even if a new voice message occurs as an interrupt during the output of the current voice message. However, with JP2010-79487A, the new voice message will not be immediately outputted as an interrupt during the output of the current voice message, regardless of how high a priority level the new voice message has. There is thus a problem in that interrupt voice messages having a high level of urgency, such as messages warning of obstructions, will not be immediately outputted, which interferes with the appropriate output timing.

SUMMARY

To solve problems such as these, it is an object of the present invention to make it possible to reduce the circumstances in which the output of interrupt information is suspended and thus reduce stress caused in a user, without missing an appropriate output timing for interrupt information having a high priority level.

In order to solve the aforementioned problems, according to an embodiment of the present invention, after the output of interrupt information starts, the value of a priority level of the interrupt information is raised during the period until the output of the interrupt information ends. When overlapping interrupts resulting from two or more pieces of interrupt information occurs (that is, when, during the output of the interrupt information, an interrupt from another piece of interrupt information occurs), control is carried out in accordance with the priority levels set for the two or more pieces of interrupt information so that the interrupt information having the higher priority level value is preferentially outputted.

According to the embodiment configured as described above, once the output of interrupt information is started, the priority level of the interrupt information being outputted rises. For this reason, in the case where during the output of interrupt information an interrupt from another piece of interrupt information occurs, a situation in which the priority level of the interrupt information being outputted becomes higher can be created even if the original priority level of the interrupt information being outputted is lower than the priority level of the other interrupt information. Through this, circumstances where the output of the interrupt information is suspended can be reduced, which makes it possible to reduce stress caused in a user. In addition, even in a state in which the priority level of the interrupt information being outputted has become high, the other interrupt information will be preferentially outputted if the priority level of that other interrupt information is higher than that of the interrupt information being outputted. As a result, it is possible to avoid missing the appropriate output timing for interrupt information of which the priority level is high.

DETAILED DESCRIPTION OF THE INVENTION

Figure 1:
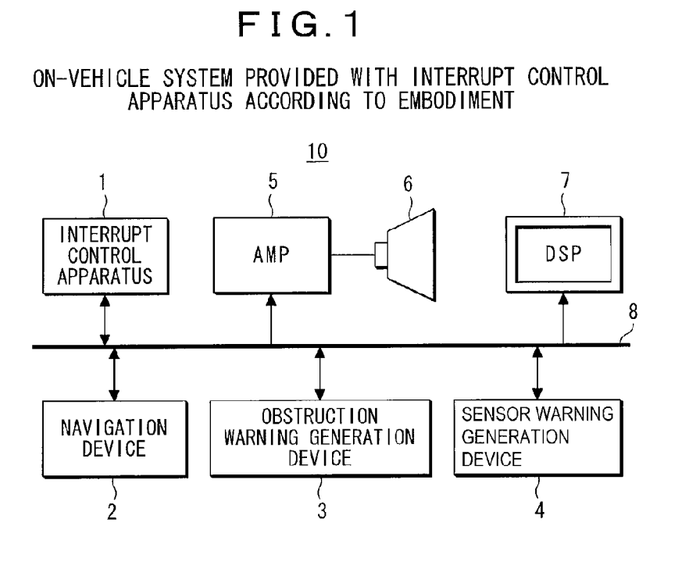
FIG. 1 is a block diagram illustrating an example of the overall configuration of an on-vehicle system provided with an interrupt control apparatus according to an embodiment.

Hereinafter, an embodiment of the present invention will be described based on the drawings. FIG. 1 is a block diagram illustrating an example of the overall configuration of an on-vehicle system 10 provided with an interrupt control apparatus 1 according to the present embodiment. As shown in FIG. 1, the on-vehicle system 10 according to the present embodiment includes the interrupt control apparatus 1, a navigation device 2, an obstruction warning generation device 3, a sensor warning generation device 4, an amplifier 5, a speaker 6, and a display 7. The interrupt control apparatus 1, the navigation device 2, the obstruction warning generation device 3, the sensor warning generation device 4, the amplifier 5, and the display 7 are networked via a bus 8 such as an on-vehicle LAN or the like.

The interrupt control apparatus 1 controls the output of interrupt voice messages generated by the navigation device 2, the obstruction warning generation device 3, and the sensor warning generation device 4. This interrupt control apparatus 1 has a function for resolving the outputs of two or more interrupt voice messages when those interrupt voice messages have occurred as interrupts overlapping each other. The specific details of this resolution will be described with reference to FIG. 2.

The navigation device 2 guides the travel of the vehicle. In other words, the navigation device 2 detects the current location of the vehicle using a dead reckoning sensor, a GPS (Global Positioning System) receiver, or the like, reads out map data of the vicinity of the detected location from a recording medium, and displays the map data on the screen of the display 7. By displaying a vehicle location mark indicating the vehicle position in a predetermined position on the screen over the map data, the location where the vehicle is currently traveling can be perceived at a glance.

Furthermore, the navigation device 2 receives road traffic information sent from a road traffic information center and displays road conditions (including traffic conditions, restriction conditions, and so on) that change over time on the screen of the display 7 at an appropriate timing. The road conditions that change over time are outputted as voice messages at an appropriate timing.

Furthermore, using the map data, the navigation device 2 searches for the route from the current location to a destination that has the lowest cost, and renders the found route on the map screen as a guidance route, with a different color and thicker line than the other roads. In addition, the navigation device 2 guides a driver to a destination by displaying, in the display 7, an enlarged picture of an intersection along a guidance route when the vehicle is within a predetermined distance from the intersection, by outputting, from the speaker 6 at an appropriate timing, voice messages for route guidance that guides the direction in which the vehicle is traveling, and so on.

The road condition voice messages, route guidance voice messages, and so on outputted as appropriate by the navigation device 2 are all interrupt voice messages. These interrupt voice messages are supplied to the interrupt control apparatus 1, and are then outputted from the speaker 6 via the amplifier 5 after undergoing control for resolution as necessary.

The obstruction warning generation device 3 detects the presence of an obstruction in the vicinity of the vehicle and generates an obstruction warning. For example, the obstruction warning generation device 3 includes a camera that captures an image of the vicinity of the vehicle, and detects the presence of an obstruction in the vicinity of the vehicle by performing an image recognition process on the image captured by the camera. Alternatively, the obstruction warning generation device 3 includes a radar such as a millimeter wave radar, an ultrasound wave radar, or the like, and detects the presence of an obstruction in the vicinity of the vehicle by emitting waves and receiving those waves that have been reflected by the obstruction. Upon detecting an obstruction in the vicinity of the vehicle, the obstruction warning generation device 3 generates an obstruction warning voice message and supplies that voice message to the interrupt control apparatus 1.

The sensor warning generation device 4 detects conditions regarding information measured by the various sensors in the vehicle of which the driver should be warned, and generates a sensor warning. For example, the sensor warning generation device 4 detects when the vehicle speed has exceeded a predetermined speed and generates a speed warning, which is one type of sensor warning. In addition, the sensor warning generation device 4 detects when the remaining amount of gasoline has dropped below a predetermined amount, and generates a remaining gasoline warning, which is also one type of sensor warning. When a sensor warning such as a speed warning, a remaining gasoline warning, or the like has been generated, the sensor warning generation device 4 supplies a voice message for that sensor warning to the interrupt control apparatus 1.

The obstruction warning voice message generated as appropriate by the obstruction warning generation device 3, the sensor warning voice messages generated as appropriate by the sensor warning generation device 4, and so on are also examples of interrupt voice messages. These interrupt voice messages are supplied to the interrupt control apparatus 1, and are then outputted from the speaker 6 via the amplifier 5 after undergoing control for resolution as necessary.

Figure 2:
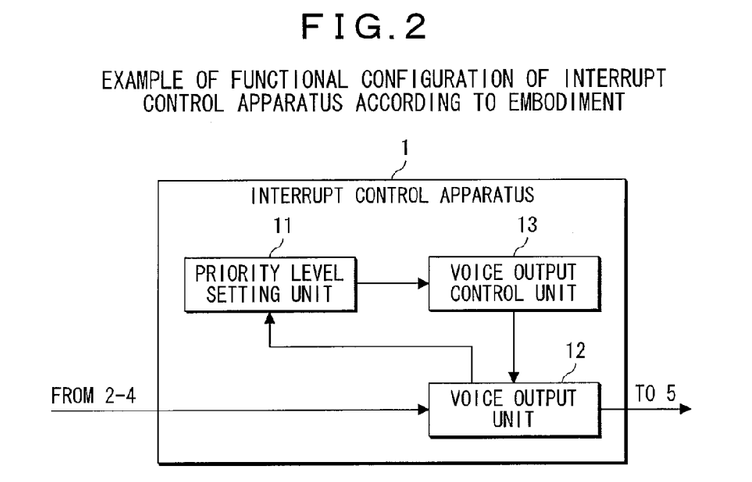
FIG. 2 is a block diagram illustrating an example of the functional configuration of the interrupt control apparatus according to the embodiment.

FIG. 2 is a block diagram illustrating an example of the functional configuration of the interrupt control apparatus 1 according to the present embodiment. The interrupt control apparatus 1 includes a CPU that executes various types of computational processes, a ROM in which various types of control programs are stored, and a RAM that is used in data storage and as a work area for executing programs. The interrupt control apparatus 1 includes, as functions executed by those constituent elements, a priority level setting unit 11, a voice output unit 12, and a voice output control unit 13.

The priority level setting unit 11 sets priority levels for each of the multiple interrupt voice messages generated by the navigation device 2, the obstruction warning generation device 3, and the sensor warning generation device 4. The priority level setting unit 11 sets the priority level in a variable manner, so that the value thereof rises during the period from when the output of an interrupt voice message is started by the voice output unit 12 until the output of the interrupt voice message ends.

To be more specific, when the output of an interrupt voice message starts by the voice output unit 12, the priority level setting unit 11 sets the priority level to an initial value in accordance with the type of that interrupt voice message. Thereafter, the priority level is set in a variable manner, so that the value thereof rises from the initial value, during the period up to when the output of that interrupt voice message ends. Note that the initial value of the priority level that is set in accordance with the type of the interrupt voice message is held in advance by the priority level setting unit 11 as, for example, information in a table.

Figure 3A:
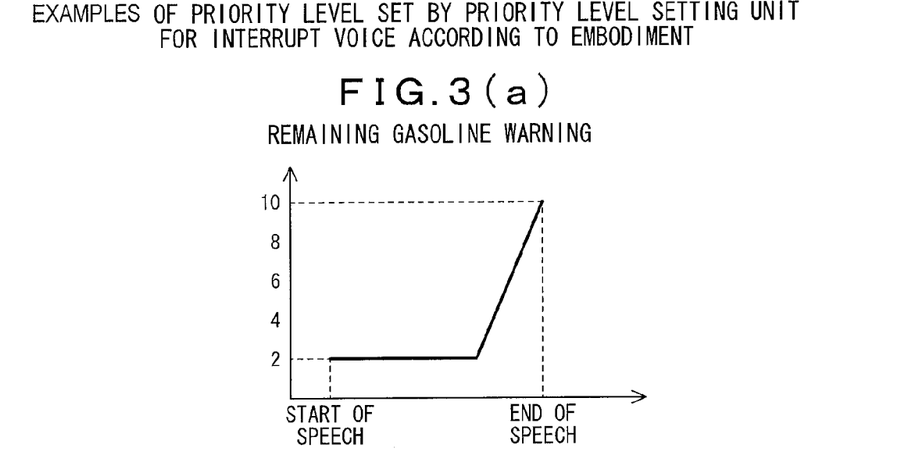
FIGS. 3(a) through 3(c) are diagrams illustrating examples of priority levels set for interrupt voice messages by a priority level setting unit according to the embodiment.
Figure 3B:
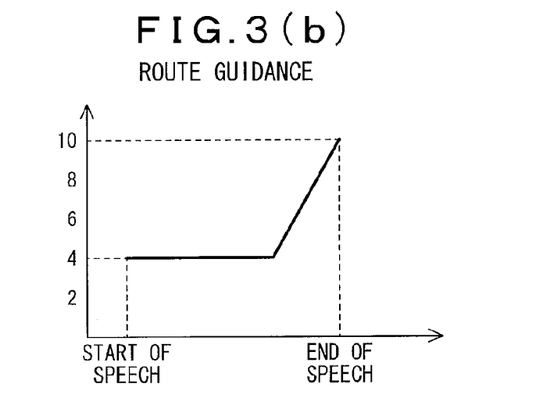
Figure 3C:
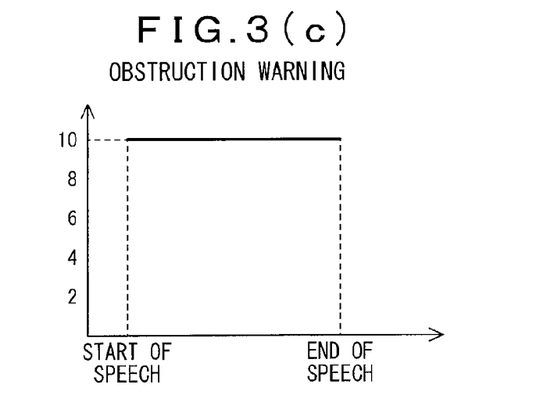

FIGS. 3(a) through 3(c) are diagrams illustrating examples of priority levels set for interrupt voice messages by the priority level setting unit 11 according to the embodiment. FIG. 3(a) illustrates an example of a priority level set for a remaining gasoline warning interrupt voice message, FIG. 3(b) illustrates an example of a priority level set for a route guidance voice message, and FIG. 3(c) illustrates an example of a priority level set for an obstruction warning interrupt voice message.

As shown in FIG. 3(a), when the output of a remaining gasoline warning voice message is started by the voice output unit 12 (that is, when the speech starts), the priority level setting unit 11 sets the initial value of the priority level that is based on the remaining gasoline warning to "2". After this, the priority level setting unit 11 raises the priority level value linearly, from a point partway through the period from when the output of the voice message is started by the voice output unit 12 to when the output of that voice message ends, until the output of the voice message ends (that is, the time when the speech ends).

Meanwhile, as shown in FIG. 3(b), when the output of a route guidance voice message is started by the voice output unit 12 (that is, when the speech starts), the priority level setting unit 11 sets the initial value of the priority level that is based on the route guidance to "4". After this, the priority level setting unit 11 raises the priority level value linearly, from a point partway through the period from when the output of the voice message is started by the voice output unit 12 to when the output of that voice message ends, until the output of the voice message ends (that is, the time when the speech ends).

Note that route guidance voice messages are outputted at multiple points, such as 300 m before an intersection along a guidance route, 50 m before the intersection along the guidance route, 10 m before the intersection along the guidance route, and so on. It is preferable to vary the initial value of the priority level for the route guidance interrupt voice message based on how many meters before the intersection the interrupt voice message is to be generated. Specifically, the initial value of the priority level is raised for interrupt voice messages generated at points that are closer to the intersection along the guidance route.

Finally, as shown in FIG. 3(c), when the output of an obstruction warning voice message is started by the voice output unit 12 (that is, when the speech starts), the priority level setting unit 11 sets the initial value of the priority level that is based on the obstruction warning to "10". This priority level value is the highest value that can be set by the priority level setting unit 11. With the priority level of the obstruction warning voice message, the priority level setting unit 11 sets the priority level to the maximum value of "10" for the entire period spanning from the start of the speech to the end of the speech. This is because an obstruction warning voice message is the interrupt voice message that has the highest level of urgency for output, compared to the other types of voice message.

In addition to the initial values of the priority levels set in accordance with the type of interrupt voice message, it should be noted that the priority level setting unit 11 holds, as information in a table, the final priority level values present at a rise end time (that is, a time when the raising of the priority level is stopped), which follows a span of time from a rise start time, when the priority level value starts to rise, until a speech end time when the output of the interrupt voice message ends. After the voice output unit 12 has finished outputting the interrupt voice message, the priority level setting unit 11 detects that the rise start time has been reached, and linearly raises the priority level value from the initial value to the final value used at the rise end time.

The voice output unit 12 takes, as an input, voice messages generated by the navigation device 2, the obstruction warning generation device 3, and the sensor warning generation device 4 as interrupt voice messages, accepts resolution thereof performed by the voice output control unit 13 as necessary, and then outputs the voice messages to the amplifier 5 via the bus 8.

In other words, when a single interrupt voice message is generated by one of the navigation device 2, the obstruction warning generation device 3, and the sensor warning generation device 4, the voice output unit 12 takes that interrupt voice message as an input and outputs that interrupt voice message to the amplifier 5 as-is. However, when two or more overlapping interrupt voice messages have been generated by the navigation device 2, the obstruction warning generation device 3, and the sensor warning generation device 4, the voice output unit 12 selectively outputs one of those interrupt voice messages to the amplifier 5 based on the resolution performed by the voice output control unit 13 in accordance with the priority levels set for those interrupt voice messages.

The voice output control unit 13 corresponds to an information output control unit according to the present invention. When two or more overlapping interrupt voice messages have been generated as interrupts by the navigation device 2, the obstruction warning generation device 3, and the sensor warning generation device 4, the voice output control unit 13 controls the voice output unit 12 so as to preferentially output the interrupt voice message having the higher priority level value, based on the priority levels set by the priority level setting unit 11 for the two or more interrupt voice messages.

In other words, in the case where another interrupt voice message is generated when the voice output unit 12 is currently outputting an interrupt voice message, the voice output control unit 13 compares the priority level set by the priority level setting unit 11 for the interrupt voice message currently being outputted with the priority level set by the priority level setting unit 11 as the initial value for the other interrupt voice message. The voice output unit 12 is then controlled to preferentially output the interrupt voice message having the higher priority level value.

For example, in the case where the priority level set for the interrupt voice message currently being outputted is higher, the voice output control unit 13 controls the voice output unit 12 so as to preferentially output the interrupt voice message currently being outputted. Then, the voice output unit 12 is controlled so as to start outputting the other interrupt voice message after the output of the interrupt voice message currently being outputted ends.

In the case where the priority level set for the other interrupt voice message is higher, the voice output control unit 13 controls the voice output unit 12 so as to suspend the output of the interrupt voice message currently being outputted and preferentially output the other interrupt voice message. Then, the voice output unit 12 is controlled so as to output the suspended interrupt voice message from the beginning after the output of the other interrupt voice message ends.

Meanwhile, in the case where the priority level set for the interrupt voice message currently being outputted and the priority level set as the initial value for the other interrupt voice message have the same value, the voice output control unit 13 controls the voice output unit 12 to continue the output of the interrupt voice message currently being outputted. Then, the voice output unit 12 is controlled so as to start outputting the other interrupt voice message after the output of the interrupt voice message currently being outputted ends.

Figure 4:
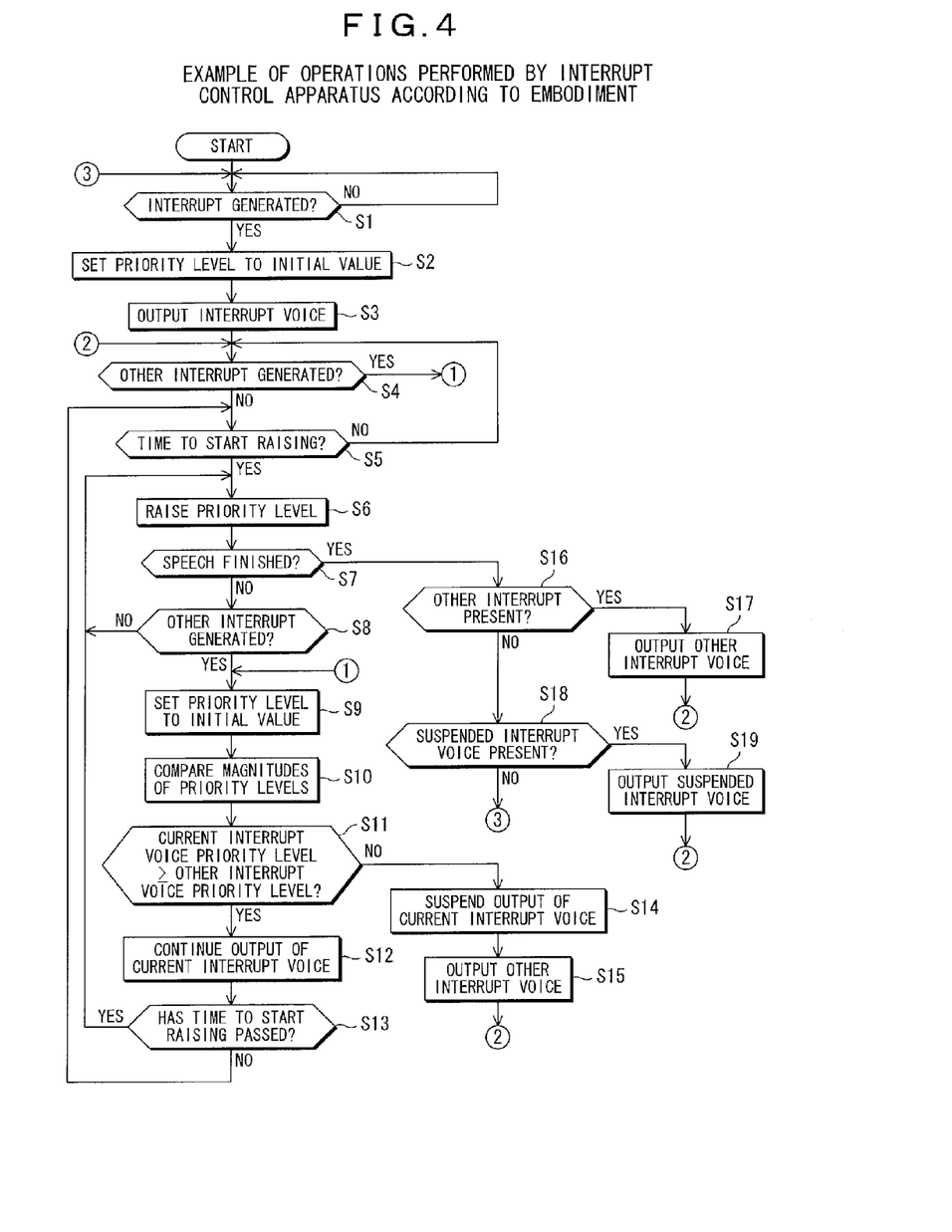
FIG. 4 is a flowchart illustrating an example of operations performed by the interrupt control apparatus according to the embodiment.

Next, operations performed by the interrupt control apparatus 1 having such a configuration according to the present embodiment will be described. FIG. 4 is a flowchart illustrating an example of operations performed by the interrupt control apparatus 1 according to the present embodiment. The flowchart shown in FIG. 4 starts when the on-vehicle system 10 is turned on.

As shown in FIG. 4, the voice output unit 12 determines whether or not any of the navigation device 2, the obstruction warning generation device 3, and the sensor warning generation device 4 have generated an interrupt voice message, or in other words, whether or not a voice message from an interrupt voice message has been inputted from any of the stated devices 2 through 4 (step S1).

In the case where it has been determined that an interrupt voice message has been generated, the voice output unit 12 notifies the priority level setting unit 11 thereof. Having received this notification, the priority level setting unit 11 sets the initial value of the priority level for the generated interrupt voice message in accordance with the type thereof (step S2). Then, the voice output unit 12 outputs, to the amplifier 5 via the bus 8, the voice message from the interrupt voice message inputted by the navigation device 2, the obstruction warning generation device 3, or the sensor warning generation device 4 (step S3).

After this, the voice output unit 12 determines whether or not any of the navigation device 2, the obstruction warning generation device 3, and the sensor warning generation device 4 have generated another interrupt voice message (step S4). In the case where it has been determined that another interrupt voice message has been generated, the process moves to step S9. However, in the case where it has been determined that another interrupt voice message has not been generated, the priority level setting unit 11 determines whether or not the rise start time, where the priority level value set as the initial value in step S2 is to be raised, has been reached (step S5). In the case where the rise start time has not been reached, the process returns to step S4.

In the case where it has been determined that the rise start time has been reached, the priority level setting unit 11 linearly raises the priority level value from the initial value toward the final value that is to be reached at the rise end time (step S6). After this, the priority level setting unit 11 determines whether or not the output of the interrupt voice message by that voice output unit 12 ends, or in other words, whether or not the priority level rise end time has been reached (step S7).

Here, in the case where it has been determined that the rise end time has not been reached, or in other words, in the case where the interrupt voice message priority level is partway through being raised, the voice output unit 12 determines whether or not another interrupt voice message has been generated by any of the navigation device 2, the obstruction warning generation device 3, and the sensor warning generation device 4 (step S8). In the case where another interrupt voice message is not being generated, the process returns to step S6, and the raising of the priority level is continued during the output of the interrupt voice message.

However, in the case where it has been determined that another interrupt voice message has been generated, the priority level setting unit 11 sets the initial value of the priority level for that other interrupt voice message in accordance with the type of the interrupt voice message (step S9). Then, the voice output control unit compares the value of the priority level set in step S2 or step S6 for the interrupt voice message currently being outputted to the initial value of the priority level set in step S9 for the other interrupt voice message (step S10), and determines whether or not the priority level of the interrupt voice message currently being outputted is greater than or equal to the priority level of the other interrupt voice message (step S11).

Note that in the case where the other interrupt voice message has been generated before the rise start time when the priority level is raised has been reached and the process has moved from step S4 to step S9, the priority level of the interrupt voice message currently being outputted remains at the initial value. Meanwhile, in the case where the other interrupt voice message has been generated after the rise start time has been reached and the process has moved from step S8 to step S9, the priority level of the interrupt voice message currently being outputted is a value found as the rise is occurring. In step S11, it is determined whether or not this priority level value for the interrupt voice message currently being outputted is greater than or equal to the initial value of the priority level for the other interrupt voice message that has newly been generated.

Here, in the case where it has been determined that the priority level of the interrupt voice message currently being outputted is greater than or equal to the priority level of the other interrupt voice message, the voice output control unit 13 controls the voice output unit 12 to continue outputting the interrupt voice message currently being outputted (step S12). At this time, in order to output the other interrupt voice message after the output of the interrupt voice message currently being outputted ends, the voice output unit 12 temporarily saves the voice message for the other interrupt voice message inputted by the navigation device 2, the obstruction warning generation device 3, or the sensor warning generation device 4.

Next, the priority level setting unit 11 determines whether or not the rise start time when the priority level value is to be raised has already passed for the interrupt voice message currently being outputted (step S13). In the case where the other interrupt voice message has been generated before the rise start time when the priority level is to be raised has been reached and the process has moved from step S4 to step S9, the rise start time has not yet passed. In this case, the process returns to step S5. On the other hand, in the case where the other interrupt voice message has been generated after the rise start time has passed and the process has moved from step S8 to step S9, the rise start time has already passed. In this case, the process returns to step S6.

In the case where it has been determined in the aforementioned step S11 that the priority level of the interrupt voice message currently being outputted is not greater than or equal to the priority level of the other interrupt voice message, the voice output control unit 13 controls the voice output unit 12 so as to suspend the output of the interrupt voice message currently being outputted (step S14) and preferentially output the other interrupt voice message (step S15). At this time, the voice output unit 12 temporarily saves the voice message for the interrupt voice message currently being outputted in order to once again output the suspended interrupt voice message from the beginning after the output of the other interrupt voice message ends. After this, the process returns to step S4. In this case, the voice output unit 12 determines whether or not yet another interrupt voice message has been generated while the other interrupt voice message is being outputted.

In the case where it has been determined in the aforementioned step S7 that the voice output unit 12 has finished outputting the interrupt voice message, or in other words, that the priority level rise end time has been reached, the voice output unit 12 determines whether or not another interrupt voice message that should be outputted thereafter is present (step S16). In the case where a voice message of another interrupt voice message is saved in the voice output unit 12, the voice output unit 12 determines that another interrupt voice message that should be outputted is present, and outputs that other interrupt voice message (step S17). After this, the process returns to step S4.

On the other hand, in the case where it has been determined that another interrupt voice message that should be outputted is not present, the voice output unit 12 determines whether or not an interrupt voice message whose output has been suspended is present (step S18). In the case where a voice message of a suspended interrupt voice message is saved in the voice output unit 12, the voice output unit 12 determines that a suspended interrupt voice message is present, and outputs that interrupt voice message from the beginning (step S19). After this, the process returns to step S4. Note that in the case where neither another interrupt voice message that should be outputted nor a suspended interrupt voice message are present, the process returns to step S1.

As described in detail above, according to the present embodiment, the priority level setting unit 11 raises the priority level value of an interrupt voice message during the period from when the voice output unit 12 begins to output the interrupt voice message until the output of that interrupt voice message ends. Then, when another interrupt voice message has been generated during the output of the original interrupt voice message, the voice output control unit 13 carries out control in accordance with the priority levels set for the two interrupt voice messages, so that the interrupt voice message having a higher priority level value is preferentially outputted.

According to the interrupt control apparatus 1 of the present embodiment configured in this manner, when the output of an interrupt voice message is started, the priority level of the interrupt voice message being outputted rises. For this reason, in the case where another interrupt voice message has been generated during the output of the original interrupt voice message, a situation in which the priority level of the interrupt voice message being outputted becomes higher than the priority level of the other interrupt voice message can be created even if the initial value of the priority level set for the interrupt voice message being outputted is lower than the initial value of the priority level of the other interrupt voice message.

Figure 5:
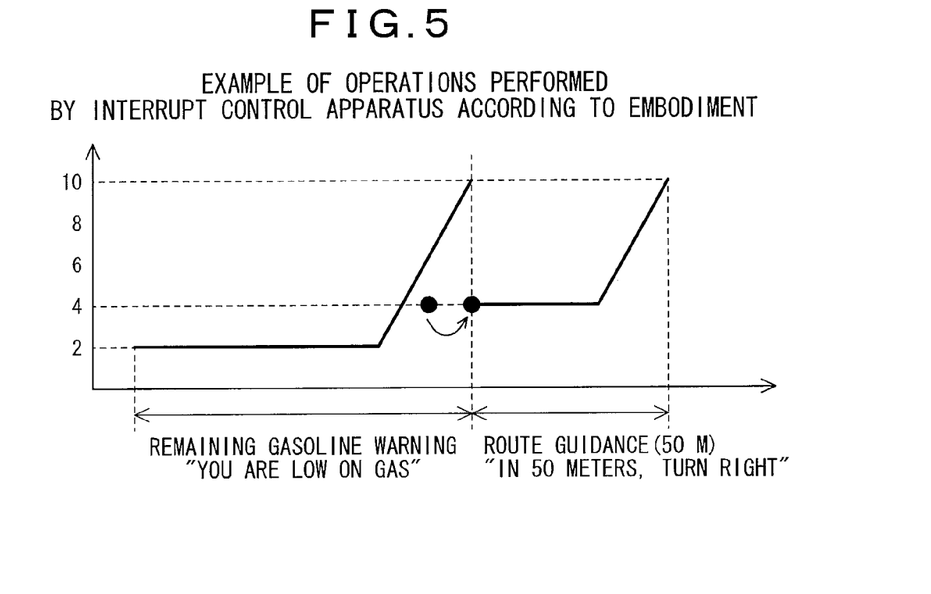
FIG. 5 is a diagram illustrating an example of operations performed by the interrupt control apparatus according to the embodiment.

For example, assume that an interrupt voice message for a remaining gasoline warning has first been generated by the sensor warning generation device 4, as shown in FIG. 5. In this case, the priority level setting unit 11 sets the priority level to be variable, as shown in FIG. 3(a). For example, assuming that the interrupt voice message for the remaining gasoline warning says "you are low on gas", the speech start time corresponds to the output of the first "you" and the speech end time corresponds to the output of the last "gas". The priority level setting unit 11 begins raising the priority level from the rise start time, which is located partway between the speech start time and the speech end time, and stops raising the priority level at the rise end time (which corresponds to the speech end time).

Next, assume that an interrupt voice message for route guidance has been newly generated by the navigation device 2 while the priority level for the remaining gasoline warning interrupt voice message is being raised. In this case, the priority level setting unit 11 sets the priority level for the route guidance interrupt voice message to the initial value. As shown in FIG. 3(b), the initial value of the priority level for the route guidance interrupt voice message is "4".

In the example shown in FIG. 5, at the point in time when the interrupt voice message for route guidance has been generated, the priority level of the interrupt voice message for the remaining gasoline warning is greater than "4". For this reason, the output of the remaining gasoline warning interrupt voice message can be outputted through to the end thereof without being suspended. The route guidance interrupt voice message is then outputted after the output of the remaining gasoline warning interrupt voice message ends. In this manner, according to the present embodiment, situations where the output of an interrupt voice message is suspended can be reduced, which makes it possible to reduce the amount of stress caused in the user (that is, stress caused by the suspension and stress caused by a repeated output).

Note that even in a state where the priority level of the interrupt voice message being outputted has increased, if the priority level of the other interrupt voice message is higher, the other interrupt voice message will preferentially be outputted. For example, assume that, in the example shown in FIG. 5, an obstruction warning interrupt voice message has been generated instead of the route guidance interrupt voice message at the same timing. In this case, the priority level setting unit 11 sets the priority level for the obstruction warning interrupt voice message to the initial value. As shown in FIG. 3(c), the initial value of the priority level for the obstruction warning interrupt voice message is "10".

In this case, even if the priority level of the remaining gasoline warning interrupt voice message is greater than "4" at the point in time when the obstruction warning interrupt voice message has been generated, the output of the remaining gasoline warning interrupt voice message can be suspended and the obstruction warning interrupt voice message can be preferentially outputted. In this manner, according to the present embodiment, it is possible to avoid missing the appropriate output timing of interrupt voice messages having high priority levels.

With the interrupt control apparatus 1 according to the present embodiment as described thus far, it is possible to reduce situations where the output of an interrupt voice message is suspended and thus reduce stress caused in a user, without missing the appropriate output timing for an interrupt voice message having a high priority level.

The aforementioned embodiment describes an example in which the value of the priority level is raised from the rise start time, which is set partway through a period spanning from when the output of the interrupt voice message starts by the voice output unit 12 until the output of the interrupt voice message ends (that is, from the speech start time to the speech end time). Although it is possible to set this rise start time as desired, it is also possible, for example, to use a first predetermined amount of time prior to the time at which the output of the interrupt voice message ends (that is, the speech end time) as this time. In this case, the first predetermined amount of time may be a different value depending on the type of the interrupt voice message, or may always be the same value.

By employing this configuration, the priority level increases near the end of an interrupt voice message output, and it is thus possible to reduce suspension and re-output particularly near the end of interrupt voice message output, thus reducing the stress caused for the user. Furthermore, because there is not a significant length of delay until the other interrupt voice message placed on hold is outputted in the case where the priority level of the interrupt voice message currently being outputted is higher, the influence of delays in the output timing can be reduced. For example, in the example shown in FIG. 5, the route guidance interrupt voice message that says "in 50 meters, turn right" is delayed by only a small amount of time, and it is thus possible to prevent the vehicle from traveling 50 meters or more and passing through the intersection on the guidance route during that delay time.

The priority level value may be raised immediately after the voice output unit 12 starts outputting the interrupt voice message. In other words, the speech start time may be aligned with the priority level rise start time. By employing this configuration, it is possible to reduce suspension and re-output after the output of the interrupt voice message is started, not only near the end of interrupt voice message output, thus reducing the stress caused for the user.

Figure 6:
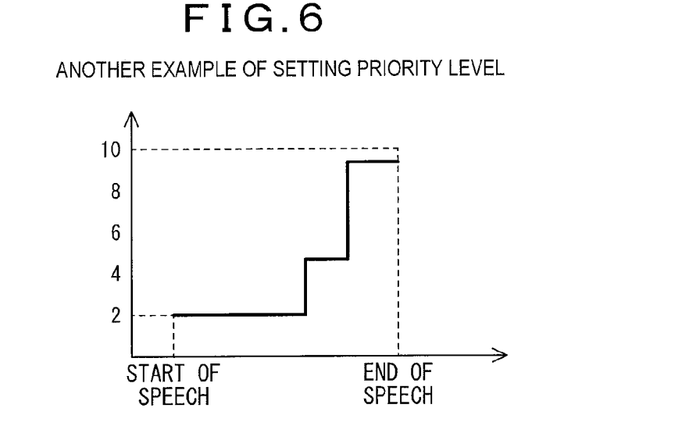
FIG. 6 is a diagram illustrating another example of priority levels set for interrupt voice messages by the priority level setting unit according to the embodiment.

Although the aforementioned embodiment describes an example in which the value of the priority level is raised linearly, the present invention is not limited thereto. For example, as shown in FIG. 6, the value of the priority level may be raised in steps. There may be one step or multiple steps in this case. It is preferable for the final value of the priority level that is raised in steps to be less than the maximum value of the priority level set for the obstruction warning interrupt voice message. This is in order to preferentially output an obstruction warning interrupt voice message, which has a high level of urgency, even near the end of interrupt voice message output.

In addition, although the aforementioned embodiment describes an example in which the speech end time is aligned with the priority level rise end time, the rise end time may be set before the speech end time. In this case, the priority level from the rise end time to the speech end time is held at the final value for the priority level set at the rise end time. As shown in FIG. 6, the pattern by which the priority level is raised in steps is an example of setting the priority level rise end time before the speech end time.

Figure 7A:
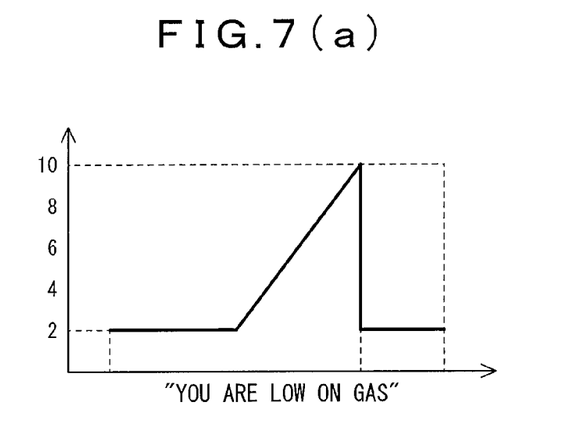
FIGS. 7(a) and 7(b) are diagrams illustrating other examples of priority levels set for interrupt voice messages by the priority level setting unit according to the embodiment.
Figure 7B:
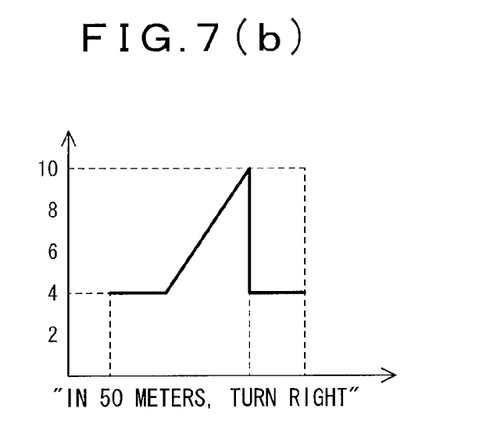

Furthermore, in the case where the rise end time is set before the speech end time, the value of the priority level may be reduced after that rise end time. For example, as shown in FIGS. 7(a) and 7(b), during the period from when the voice output unit 12 starts outputting an interrupt voice message to when the output of the interrupt voice message ends, the priority level setting unit 11 raises the priority level, linearly or in steps, so that the value increases toward the speech end time for the interrupt voice message. Then, the value of the priority level is reduced at a time before the end of interrupt voice message output by a second predetermined amount of time. For example, the priority level may be returned to the initial value.

In this case, it is preferable for the second predetermined amount of time to be a different value depending on the type of the interrupt voice message. For example, for the remaining gasoline warning interrupt voice message that says "you are low on gas", the time allotted to the speech of the portion that says the last "s" is set as the second predetermined amount of time. For the route guidance interrupt voice message that says "in 50 meters, turn right", the time allotted to the speech of the portion that says the last "t" is set as the second predetermined amount of time.

The portion "s" in the remaining gasoline warning and the portion "t" in the route guidance are trivial portions that result in almost no problems even if the user does not hear those portions. Conversely, the portion "you are low on ga(s)" in the remaining gasoline warning and "in 50 meters, turn righ(t)" in the route guidance are important portions without which the meaning of the voice messages will not be understood. If the priority level is lowered for the stated trivial portions, the important portions of the interrupt voice messages currently being outputted can be outputted preferentially; as to the trivial portions, another interrupt voice message generated later can be outputted preferentially.

Note that in the case where the output of a trivial portion of an interrupt voice message currently being outputted is suspended and another interrupt voice message generated later is outputted preferentially, the suspended interrupt voice message does not need to be outputted again. This is because the important portion of the voice message for the interrupt voice message has already been outputted, and the user that has listened thereto sufficiently understands the content of that voice message.

Accordingly, in the case where another interrupt voice message having a higher priority level than the priority level set for the interrupt voice message currently being outputted (that is, a low value that has been reduced) is generated during the period spanning from a time before the speech end time by the second predetermined amount of time to the speech end time, it is preferable for the voice output control unit 13 to suspend the output of the interrupt voice message currently being outputted and control the voice output unit 12 to output the other interrupt voice message, as well as to control the voice output unit 12 not to output the suspended interrupt voice message again after the output of the other interrupt voice message ends.

In order to carry out such control, the voice output control unit 13 determines at what time the interrupt voice message currently being outputted was suspended. In the case where it has been determined that the interrupt voice message was suspended during the period spanning from the time before the speech ends by the second predetermined amount of time to the speech end time, the voice message for the suspended interrupt voice message is, for example, erased without being held in the voice output unit 12.

Although the aforementioned embodiment describes an example in which the interrupt control apparatus 1 includes the function of the voice output unit 12, it should be noted that the present invention is not limited thereto. For example, the navigation device 2, the obstruction warning generation device 3, and the sensor warning generation device 4 may each have the functionality of the voice output unit 12.

In this case, instead of outputting the voice message of a generated interrupt voice message to the interrupt control apparatus 1, the navigation device 2, the obstruction warning generation device 3, and the sensor warning generation device 4 communicate interrupt information, which expresses the content of the generated interrupt voice message, to the interrupt control apparatus 1. The interrupt control apparatus 1 resolves which interrupt voice message to output in accordance with this interrupt information, and outputs the result of this resolution to the navigation device 2, the obstruction warning generation device 3, and the sensor warning generation device 4. Based on the results of the resolution, the navigation device 2, the obstruction warning generation device 3, and the sensor warning generation device 4 output a voice message to the amplifier 5 via the bus 8.

Although the aforementioned embodiment describes a road conditions voice message, a route guidance voice message, an obstruction warning voice message, a speed warning voice message, and a remaining gasoline warning voice message as examples of interrupt voice messages, the types of the interrupt voice messages are not limited thereto.

In addition, although the aforementioned embodiment describes an example in which the output of multiple interrupt voice messages is controlled in accordance with priority levels set for each of those interrupt voice messages, the present invention is not limited thereto. For example, the output of multiple interrupt images may be controlled in accordance with priority levels set for each of those interrupt images.

For example, road conditions images, enlarged views of intersections, and so on outputted as appropriate by the navigation device 2 are examples of interrupt images. Furthermore, there may be a case where an obstruction warning interrupt image is generated when the obstruction warning generation device 3 has detected an obstruction in the vicinity of the vehicle. Further still, there may be a case where a sensor warning interrupt image is generated when the sensor warning generation device 4 has detected, from information measured by the various sensors in the vehicle, a situation of which the driver should be warned.

Accordingly, it is possible for the navigation device 2, the obstruction warning generation device 3, and the sensor warning generation device 4 to supply these interrupt images to the interrupt control apparatus 1, with the images then being outputted to the display 7 after undergoing control for resolution as necessary. The aforementioned embodiment can also be applied in such a case. Note that in the case where interrupt images are applied in the aforementioned embodiment, the interrupt voice message speech start time corresponds to an interrupt image display start time, and the speech end time corresponds to a display end time.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An interrupt control apparatus comprising:
a priority level setting unit that sets a priority level for each of multiple pieces of interrupt information; and
a information output control unit that, when interrupts from two or more overlapping pieces of interrupt information have occurred, carries out control in accordance with the priority levels set by the priority level setting unit for the two or more pieces of interrupt information so that the interrupt information having the higher priority level value is outputted preferentially,
wherein the priority level setting unit sets the priority level of at least one of the multiple pieces of interrupt information to be variable so that the value of the priority level linearly increases during a period from when the output of the interrupt information starts to when the output of the interrupt information ends.

2. The interrupt control apparatus according to claim 1, wherein the priority level setting unit raises the value of the priority level linearly during a period that starts partway through the period extending from when the output of the interrupt information starts to when the output of the interrupt information ends, and ends when the output of the interrupt information ends.

3. The interrupt control apparatus according to claim 2, wherein a rise start time when the value of the priority level begins to be raised from partway through the stated period is a time that is a first predetermined amount of time prior to a speech end time when the output of the interrupt information ends.

4. The interrupt control apparatus according to claim 1, wherein the priority level setting unit raises the value of the priority level linearly during a period that extends between when the output of the interrupt information starts to when the output of the interrupt information ends.

5. The interrupt control apparatus according to claim 1, wherein when the output of the interrupt information starts, the priority level setting unit sets an initial value for the priority level in accordance with the type of the interrupt information, and sets the priority level to be variable so that the value rises from the initial value during the period spanning until the output of the interrupt information ends.

6. The interrupt control apparatus according to claim 5, wherein in the case where an interrupt of another interrupt information occurs during the output of interrupt information, the information output control unit carries out control so that the output of the interrupt information being outputted is continued in the case where the value of the priority level set for the interrupt information being outputted is greater than or equal to the value of the priority level set as the initial value for the other interrupt information.

7. The interrupt control apparatus according to claim 1, wherein during a period spanning from when the output of the interrupt information starts to when the output of the interrupt information ends, the priority level setting unit raises the priority level so that the value increases toward the end of the output of the interrupt information, and reduces the value of the priority level at a time that is a second predetermined amount of time prior to a speech end time when the output of the interrupt information ends.

8. The interrupt control apparatus according to claim 7, wherein in the case where during a period from prior to the second predetermined amount of time up to the end of the output of the interrupt information, an interrupt of another interrupt information that is set to a higher priority level than the priority level set for the interrupt information being outputted occurs, the information output control unit carries out control so that the output of the interrupt information being outputted is suspended and the other interrupt information is outputted, and carries out control so that the interrupt information being outputted is not outputted once again after the output of the other interrupt information has ended.

9. An interrupt control method comprising:
a first step of, when an interrupt resulting from interrupt information occurs, a computer in an interrupt control apparatus setting an initial value of a priority level for the interrupt information;
a second step of the computer outputting the interrupt information;
a third step of setting the priority level in a variable manner so that the value of the initial value rises during a period spanning from after the output of the interrupt information starts to when the output of the interrupt information ends;
a fourth step of, when an interrupt resulting from another interrupt information occurs after the output of the interrupt information starts, the computer setting the priority level for the other interrupt information to an initial value; and
a fifth step of the computer comparing the value of the priority level set for the interrupt information in the third step with the initial value of the priority level set for the other interrupt information in the fourth step and carrying out control so that the interrupt information having the higher priority level value is preferentially outputted;
wherein during a period spanning from when the output of the interrupt information starts to when the output of the interrupt information ends, the priority level is raised so that the value increases toward the end of the output of the interrupt information, and the value of the priority level is reduced at a time that is a second predetermined amount of time prior to a speech end time when the output of the interrupt information ends.

10. The interrupt control method according to claim 9, wherein in the third step the value of the priority level is raised linearly during a period that starts partway through the period extending from when the output of the interrupt information starts to when the output of the interrupt information ends.

11. The interrupt control method according to claim 10, wherein a rise start time when the value of the priority level begins to be raised from partway through the stated period is a time that is a first predetermined amount of time prior to a speech end time when the output of the interrupt information ends.

12. The interrupt control method according to claim 9, wherein in the third step the value of the priority level is raised in steps during a period that starts partway through the period extending from when the output of the interrupt information starts to when the output of the interrupt information ends.

13. The interrupt control method according to claim 9, wherein in the third step the value of the priority level is raised linearly during a period that extends between when the output of the interrupt information starts to when the value of the priority level is reduced.

14. The interrupt control method according to claim 9, wherein when the output of the interrupt information starts, an initial value for the priority level is set in accordance with the type of the interrupt information, and the priority level is set to be variable so that the value rises from the initial value during the period spanning until the output of the interrupt information ends.

15. The interrupt control method according to claim 14, wherein in the case where an interrupt of another interrupt information occurs during the output of interrupt information, the output of the interrupt information being outputted is continued in the case where the value of the priority level set for the interrupt information being outputted is greater than or equal to the value of the priority level set as the initial value for the other interrupt information.

16. The interrupt control method according to claim 9, wherein in the case where during a period from prior to the second predetermined amount of time up to the end of the output of the interrupt information, an interrupt of another interrupt information that is set to a higher priority level than the priority level set for the interrupt information being outputted occurs, the output of the interrupt information being outputted is suspended and the other interrupt information is outputted, and the interrupt information being outputted is not outputted once again after the output of the other interrupt information has ended.

17. An interrupt control apparatus comprising:
a priority level setting unit that sets a priority level for each of multiple pieces of interrupt information; and
a information output control unit that, when interrupts from two or more overlapping pieces of interrupt information have occurred, carries out control in accordance with the priority levels set by the priority level setting unit for the two or more pieces of interrupt information so that the interrupt information having the higher priority level value is outputted preferentially,
wherein the priority level setting unit sets the priority level of at least one of the multiple pieces of interrupt information to be variable so that the value of the priority level increases during a period from when the output of the interrupt information starts to when the output of the interrupt information ends, and
wherein during a period spanning from when the output of the interrupt information starts to when the output of the interrupt information ends, the priority level setting unit raises the priority level so that the value increases toward the end of the output of the interrupt information, and reduces the value of the priority level at a time that is a second predetermined amount of time prior to a speech end time when the output of the interrupt information ends.

18. The interrupt control apparatus according to claim 17, wherein in the case where during a period from prior to the second predetermined amount of time up to the end of the output of the interrupt information, an interrupt of another interrupt information that is set to a higher priority level than the priority level set for the interrupt information being outputted occurs, the information output control unit carries out control so that the output of the interrupt information being outputted is suspended and the other interrupt information is outputted, and carries out control so that the interrupt information being outputted is not outputted once again after the output of the other interrupt information has ended.

* * * * *